United States Patent
Seto et al.

(10) Patent No.: US 10,280,091 B2
(45) Date of Patent: May 7, 2019

(54) YTTRIUM OXYFLUORIDE, STARTING MATERIAL POWDER FOR PRODUCTION OF STABILIZED YTTRIUM OXYFLUORIDE, AND METHOD FOR PRODUCING STABILIZED YTTRIUM OXYFLUORIDE

(71) Applicant: Mitsui Mining & Smelting Co., Ltd., Tokyo (JP)

(72) Inventors: Yasuhiro Seto, Omuta (JP); Shoji Imaura, Omuta (JP); Masahiro Koide, Omuta (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 15/749,432

(22) PCT Filed: Mar. 29, 2016

(86) PCT No.: PCT/JP2016/060240
§ 371 (c)(1),
(2) Date: Jan. 31, 2018

(87) PCT Pub. No.: WO2017/043117
PCT Pub. Date: Mar. 16, 2017

(65) Prior Publication Data
US 2018/0230022 A1 Aug. 16, 2018

(30) Foreign Application Priority Data
Sep. 7, 2015 (JP) .................................. 2015-175576

(51) Int. Cl.
| | | |
|---|---|---|
| *C01F 17/00* | (2006.01) | |
| *C01F 11/22* | (2006.01) | |
| *C01B 11/24* | (2006.01) | |
| *C04B 35/553* | (2006.01) | |

(52) U.S. Cl.
CPC .............. *C01F 17/00* (2013.01); *C01B 11/24* (2013.01); *C01F 11/22* (2013.01); *C04B 35/553* (2013.01); *C01P 2002/30* (2013.01); *C01P 2002/72* (2013.01); *C01P 2002/88* (2013.01); *C01P 2004/51* (2013.01); *C01P 2004/61* (2013.01); *C04B 2235/3203* (2013.01); *C04B 2235/3208* (2013.01); *C04B 2235/3225* (2013.01); *C04B 2235/3895* (2013.01); *C04B 2235/5436* (2013.01); *C04B 2235/604* (2013.01); *C04B 2235/661* (2013.01); *C04B 2235/762* (2013.01); *C04B 2235/80* (2013.01); *C04B 2235/81* (2013.01)

(58) Field of Classification Search
CPC ...... C01F 17/00; C04B 35/50; C04B 35/5156
USPC .......................................................... 423/263
See application file for complete search history.

(56) References Cited

U.S. PATENT DOCUMENTS

| | | | |
|---|---|---|---|
| 4,057,433 A | 11/1977 | Brown | |
| 4,515,706 A * | 5/1985 | Takahara | ........... C09K 11/7788 |
| | | | 250/484.4 |
| 2014/0057078 A1 * | 2/2014 | Hamaya | ................... C09D 5/18 |
| | | | 428/148 |
| 2015/0096462 A1 | 4/2015 | Fukagawa et al. | |

FOREIGN PATENT DOCUMENTS

| | | |
|---|---|---|
| CN | 104701125 A | 6/2015 |
| EP | 0927749 A1 | 7/1999 |
| JP | 2000-239067 A | 9/2000 |
| WO | WO-2009-158564 A1 | 12/2009 |

OTHER PUBLICATIONS

Yoshihisa Nonogaki et al., "Ionic conductivity and thermal stability of the system CaF2-YF3 (CaF2-YOF)", Ceramics Kiso Kagaku Toronkai Koen Yoshishu, Jan. 27, 1994 (Jan. 27, 1994), Dai 32 Kai, pp. 122-123.
Katsumi Yoshida et al., " YOF Ceramics no Sakusei to Hyoka", The Ceramic Society of Japan Nenkai Koen Yokoshu, Mar. 6, 2015 (Mar. 6, 2015), 2015 Nen Nenkai, p. 2C33.

* cited by examiner

*Primary Examiner* — Steven J Bos
(74) *Attorney, Agent, or Firm* — Harness, Dickey & Pierce, P.L.C.

(57) ABSTRACT

An yttrium oxyfluoride is represented by YOF and is stabilized by a fluoride represented by $CaF_2$. Preferably, the number of moles of Ca with respect to 100 mol of yttrium is from 8 to 40 mol. A powder material is made of a first powder mixture including a calcium fluoride powder represented by $CaF_2$ and an yttrium oxyfluoride powder represented by YOF, or a second powder mixture including a calcium fluoride powder represented by $CaF_2$, an yttrium fluoride powder represented by $YF_3$, and an yttrium oxide powder represented by $Y_2O_3$. A production method involves firing a molded product of the first or second powder mixture under predetermined conditions.

10 Claims, 6 Drawing Sheets

YTTRIUM OXYFLUORIDE, STARTING MATERIAL POWDER FOR PRODUCTION OF STABILIZED YTTRIUM OXYFLUORIDE, AND METHOD FOR PRODUCING STABILIZED YTTRIUM OXYFLUORIDE

CROSS-REFERENCE TO RELATED APPLICATIONS

This application is a U.S. National Stage Application of International Application No. PCT/JP2016/060240, filed on Mar. 29, 2016, and claims priority to Japanese Patent Application No. 2015-175576, filed on Sep. 7, 2015. The entire disclosures of the above applications are incorporated herein by reference.

BACKGROUND

Technical Field

The present invention relates to an yttrium oxyfluoride whose cubic crystal structure is stabilized by using a specific compound, a powder material for producing the stabilized yttrium oxyfluoride, and a method for producing the stabilized yttrium oxyfluoride.

Related Art

Yttrium oxyfluoride has conventionally been used in various applications such as phosphorescent materials for producing ink, and molds for casting high-melting-point reactive metals (WO 2009/158564 and U.S. Pat. No. 4,057,433). There have also been reports that the use of yttrium oxyfluoride as a thermal spraying material obtains a thermal spray film having improved resistance to halogen-based plasma (US 2015/096462).

It is known that, in general, an yttrium oxyfluoride represented by YOF has a rhombohedral crystal structure at room temperature and has a cubic or tetragonal crystal structure at high temperatures above 600° C., and undergoes phase transition from a cubic or tetragonal crystal to a rhombohedral crystal at 550 to 600° C. when cooled from a high temperature. This phase transition involves a change in volume, thus causing stress in the yttrium oxyfluoride accompanying the phase transition during cooling. Likewise, when heating the yttrium oxyfluoride from room temperature to high temperatures above 600° C., similar stress occurs due to phase transition. In cases where, for example, the yttrium oxyfluoride has a shape, such as a film- or bulk-form, that is greatly affected by strain caused by volumetric change, the aforementioned stress may cause fracture/cracking.

An objective of the invention is to provide an yttrium oxyfluoride capable of overcoming the various drawbacks of the aforementioned conventional art.

SUMMARY OF THE INVENTION

Inventors have found that, surprisingly, the use of calcium fluoride represented by $CaF_2$ to stabilize yttrium oxyfluoride effectively suppresses crystal phase transition in the yttrium oxyfluoride in relation to temperature change.

The present invention is based on the above-mentioned finding and to provide an yttrium oxyfluoride represented by YOF, the yttrium oxyfluoride being stabilized by a calcium fluoride represented by $CaF_2$.

The present invention provides a powder material for producing a stabilized yttrium oxyfluoride, the powder material including a powder mixture including a calcium fluoride powder represented by $CaF_2$ and an yttrium oxyfluoride powder represented by YOF.

The present invention is to provide a powder material for producing a stabilized yttrium oxyfluoride, the powder material comprising a powder mixture including a calcium fluoride powder represented by $CaF_2$, an yttrium fluoride powder represented by $YF_3$, and an yttrium oxide powder represented by $Y_2O_3$.

The present invention provides a method for producing a stabilized yttrium oxyfluoride, the method comprising a step of firing, in an inert atmosphere or in a vacuum at a temperature from 800° C. to 1700° C., a molded product of a powder mixture including a calcium fluoride powder represented by $CaF_2$ and an yttrium oxyfluoride powder represented by YOF.

The present invention is to provide a method for producing a stabilized yttrium oxyfluoride, the method comprising a step of
firing a molded product of a powder mixture including a calcium fluoride powder represented by $CaF_2$, an yttrium fluoride powder represented by $YF_3$, and an yttrium oxide powder represented by $Y_2O_3$ to thus produce an yttrium oxyfluoride represented by YOF from $YF_3$ and $Y_2O_3$, and
then firing the fired molded product in an inert atmosphere or in a vacuum at a temperature from 800° C. to 1700° C.

Advantageous Effects of Invention

According to the yttrium oxyfluoride of the present invention, phase transition between a cubic or tetragonal crystal and a rhombohedral crystal during heating or cooling is prevented effectively. This thereby effectively prevents fracture/cracking during heating or cooling in cases where the yttrium oxyfluoride of the invention is made into a sintered compact, a thermal spray film, or the like. Further, this yttrium oxyfluoride can be suitably produced by using the present powder material for producing a stabilized yttrium oxyfluoride. Furthermore, this yttrium oxyfluoride can be suitably produced by the present method for producing a stabilized yttrium oxyfluoride.

DETAILED DESCRIPTION OF THE PREFERRED EMBODIMENTS

Figure 1:
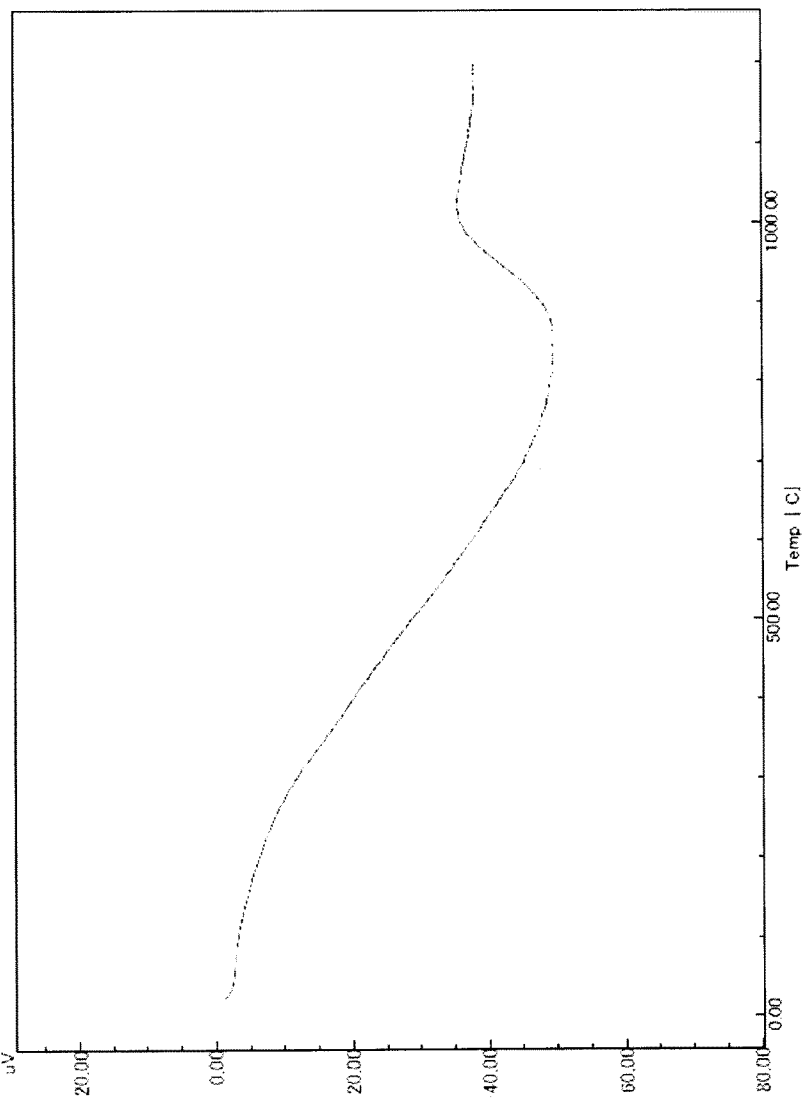
FIG. 1 is a chart of differential thermal analysis (referred to hereinafter as DTA) for when the temperature of a stabilized yttrium oxyfluoride obtained according to Example 3 is raised from room temperature to 1000° C.

The present invention is described below according to preferred embodiments thereof with reference to the drawings.

The yttrium oxyfluoride of the present invention is represented by YOF. The yttrium oxyfluoride of the invention is a compound consisting of yttrium (Y), oxygen (O), and fluorine (F), and is a compound in which the molar ratio, Y:O:F, among yttrium (Y), oxygen (O), and fluorine (F) is 1:X:Y, where X is from 0.9 to 1.1 and Y is from 0.9 to 1.1. Preferably, X or Y is 1, and more preferably X and Y are 1.

A feature of the yttrium oxyfluoride of the invention is that it is stabilized by using a fluoride represented by $CaF_2$ as a stabilizer.

The expression "the yttrium oxyfluoride of the invention is stabilized" means that the state of the cubic crystal of the yttrium oxyfluoride in a low-temperature phase below 550° C. is stabilized compared to a pure product of yttrium oxyfluoride. For example, the yttrium oxyfluoride of the invention which is stabilized by $CaF_2$ has a cubic crystal phase at 25° C. In the present invention, verification by one of the following three methods, for example, will suffice to confirm that the yttrium oxyfluoride is stabilized.

The first method is to subject an yttrium oxyfluoride to powder X-ray diffraction measurement at atmospheric temperature, for example 25° C., within the range 2θ=10° to 90°. As is apparent by comparing the XRD pattern of a cubic YOF shown in the bottom chart in FIG. 3 and the XRD pattern of a rhombohedral YOF shown in the middle chart in FIG. 6, the peaks of a cubic YOF in the range 2θ=10° to 90° are all close to the peaks of a rhombohedral crystal, and are thus often difficult to distinguish from the rhombohedral crystal peaks. So, when an yttrium oxyfluoride is subjected to the aforementioned powder X-ray diffraction measurement, determination of whether or not the YOF has been stabilized focuses mainly on whether or not there is a peak specific to a rhombohedral crystal. The specific peak is a reflection peak from the (003) plane of a rhombohedral YOF observed at around 2θ=14°. On the premise that no other XRD peaks caused by YOF other than cubic and rhombohedral crystals are observed, it can be said that the yttrium oxyfluoride is stabilized in cases where the aforementioned specific peak intensity in the rhombohedral crystal is not observed in the yttrium oxyfluoride, or in cases where the specific peak is observed only slightly so as to satisfy the following specific conditions.

The specific conditions are that: a main peak of a cubic YOF is observed at 2θ=28.81°; and the intensity of the specific peak of the rhombohedral crystal is less than one one-hundredth of the peak intensity of the main peak of the cubic YOF. Herein, the ratio in peak intensity is measured as the ratio in peak height.

The peak positions and peak reflection plane indices of YOF by XRD measurement are based on the description of ICDD cards.

The second method is to subject an yttrium oxyfluoride to DTA measurement wherein the temperature is raised from 25° C. to 1000° C. at a temperature rise rate of 5° C./min.

In this case, if no endothermic peak caused by phase transition from a cubic or tetragonal crystal to a rhombohedral crystal is observed in the range from 550 to 600° C., it can be verified that the yttrium oxyfluoride is stabilized. DTA measurement can be performed according to the method described in detail in the Examples further below.

The third method is to subject an yttrium oxyfluoride to TMA measurement wherein the temperature is lowered from 1000° C. to 25° C. at a temperature drop rate of 5° C./min. In this case, verification can be made if no point of discontinuity in dimensional change caused by phase transition is observed within the measurement range. In this invention, "having a point of discontinuity in dimensional change" means that two inflection points are observed during temperature rise and/or temperature drop in TMA measurement.

More specifically, this is judged as follows. For example, in the TMA measurement of Comparative Example 1 shown in FIG. 5, two inflection points are observed during temperature rise within the range from 400° C. to 600° C. during temperature rise. "Having a point of discontinuity in a TMA curve" means that, when the low-temperature-side point of the two inflection points is defined as T1 and the high-temperature-side point is defined as T2, a tangent line of the TMA curve at a point that is, for example, 10° C. toward the low-temperature side than T1 and a tangent line of the TMA curve located at the center between T1 and T2 intersect only at one intersection point and do not have the same inclination.

TMA measurement can be performed according to the method described in detail in the Examples further below.

If it is verified, by one of the three methods described above, that the yttrium oxyfluoride of the invention is stabilized, it is defined that the yttrium oxyfluoride is stabilized.

It is preferable that the yttrium oxyfluoride of the invention is a solid solution in which a fluoride represented by $CaF_2$ is solid-soluted in an yttrium oxyfluoride represented by YOF. The presence of the solid solution can be verified, for example, if no peak ascribable to the fluoride represented by $CaF_2$ is observed when the yttrium oxyfluoride is subjected to powder X-ray diffraction measurement employing a scanning range of 2θ=10° to 90° and employing a CuKα1 line as the radiation source, on condition that the elements Ca and fluorine are present in the yttrium oxyfluoride. The presence of the elements Ca and fluorine can be verified by fluorescent X-ray analysis or the like. The aforementioned powder X-ray diffraction measurement is performed according to the method described in the Examples further below.

In the yttrium oxyfluoride of the invention, it is preferable that no peak ascribable to a fluoride represented by $CaF_2$ is observed in the powder X-ray diffraction measurement within the aforementioned scanning range and employing the aforementioned radiation source. However, a portion of the fluoride may exist in the yttrium oxyfluoride without being solid-soluted in a range that does not impair the effects of the invention. For example, when the yttrium oxyfluoride of the invention is subjected to the aforementioned powder X-ray diffraction measurement, a peak ascribable to a fluoride represented by $CaF_2$ may be observed in a range that does not impair the effects of the invention.

In the yttrium oxyfluoride of the invention, it is preferable that the number of moles of Ca is from 10 to 40 mol with respect to 100 mol of yttrium (Y). Including greater than or equal to 15 mol of the element Ca suppresses phase transition from a cubic or tetragonal crystal to a rhombohedral crystal even more effectively. Further, when the number of moles of Ca with respect to the number of moles of yttrium (Y) is 40 mol or less, it is possible to reduce the amount of fluoride represented by $CaF_2$ that is deposited without solid-soluting in the yttrium oxyfluoride, and thus suppress the influence on the yttrium oxyfluoride's physical properties caused by the presence of the fluoride. For example, $CaF_2$ has a higher thermal expansion coefficient than YOF; so, by reducing the deposition amount, it is possible to prevent the volumetric change of the yttrium oxyfluoride during heating. From this viewpoint, the ratio of the number of moles of Ca with respect to 100 mol of yttrium (Y) is more preferably from 15 to 35 mol, even more preferably from 15 to 30 mol, and further more preferably from 15 to 25 mol. The number of moles of yttrium (Y) and the number of moles of Ca in the yttrium oxyfluoride can be measured according to one of the following methods.

That is, measurement can be performed by calculating the molar concentration from the result of quantitative analysis of Ca and Y by one of various analysis methods such as the fluorescent X-ray method, the ICP-AES method, the ICP-MS method, or the atomic absorption method.

The yttrium oxyfluoride of the invention may be in powder form, in granular form, in bulk form, in film form, dense, or porous. "Bulk form" refers to a form in which the size of the outer shape can be visually recognized by the naked eye, and refers to a form in which at least one of the three dimensions, i.e., the length, width, and thickness, is greater than or equal to 1 mm, for example. A bulk-form yttrium oxyfluoride may be, for example, a sintered compact or a crystalline body. "Film form" refers to a form wherein, among the three dimensions, i.e., the length, width, and thickness, the thickness is smaller than the length and the width, and the thickness is less than or equal to 1 mm.

A bulk-form yttrium oxyfluoride can be suitably produced, for example, as a sintered compact according to the later-described method for producing a stabilized yttrium oxyfluoride.

A film-form yttrium oxyfluoride can be made by obtaining a powder material by pulverizing a sintered compact or fired product obtained, for example, by the later-described method for producing a stabilized yttrium oxyfluoride, and then forming a film by subjecting the powder material to a film-forming method such as thermal spraying, aerosol deposition, physical vapor deposition (PVD), or ion plating. Here, a "sintered compact" refers to a bulk-form product. On the other hand, a "fired product" not only includes sintered compacts, but also includes powder-form products. Examples of thermal spraying methods include flame spraying, high-speed flame spraying, detonation spraying, laser spraying, plasma spraying, and laser-plasma hybrid spraying.

By using a powder-form yttrium oxyfluoride, or a granular-form yttrium oxyfluoride made by granulating the powder, as a raw material, a film-form yttrium oxyfluoride can be formed as described above, and the film-form yttrium oxyfluoride can attain the effect of improved durability by the suppression of phase transition.

The invention is preferable particularly in cases where the yttrium oxyfluoride of the invention has a shape, such as a bulk- and/or film-form, that is greatly affected by strain caused by volumetric change, because the effect of preventing fracture/cracking, i.e., the effect of improved durability, obtained by the suppression of phase transition in the yttrium oxyfluoride of the invention can be directly enjoyed. It is particularly preferable if the yttrium oxyfluoride of the invention is in bulk form such as a sintered compact, because the yttrium oxyfluoride can be suitably used for constituent members of semiconductor manufacturing devices as a bulk body having high resistance to halogen-based plasma and in which durability is ensured.

Next a suitable powder material for producing a stabilized yttrium oxyfluoride of the invention is described. In the present invention, both the first powder material and the second powder material, which are described below, can be suitably used as the powder material for producing a stabilized yttrium oxyfluoride. The crystal structure of the yttrium oxyfluoride powder represented by YOF in the first powder material and the second powder material may be rhombohedral or tetragonal, and a rhombohedral crystal is preferable in terms of easy availability.

The first powder material is made of a powder mixture including a calcium fluoride powder represented by $CaF_2$ and an yttrium oxyfluoride powder represented by YOF. From the viewpoint of producing a stabilized yttrium oxyfluoride having the excellent effects of the present invention, it is preferable that the amount of the calcium fluoride powder in the first powder material is such that the number of moles of $CaF_2$ with respect to 100 mol of YOF in the yttrium oxyfluoride powder is preferably from 8 to 40 mol, more preferably from 10 to 35 mol, even more preferably from 15 to 30 mol, and further more preferably from 15 to 25 mol.

The first powder material may include components other than the calcium fluoride powder represented by $CaF_2$ and the yttrium oxyfluoride powder represented by YOF. However, from the viewpoint of improving the durability and plasma resistance of the stabilized yttrium oxyfluoride using the powder material, it is preferable that the total content of the fluoride powder and the yttrium oxyfluoride powder in the first powder material is preferably 50 mass % or greater, more preferably 80 mass % or greater, and even more preferably 90 mass % or greater. The higher the percentage of the total content of the aforementioned powders in the first powder material, the more preferable.

From the viewpoint of achieving the effects of the invention more reliably and ensuring mixture uniformity, the average particle size $D_{50}$ of the yttrium oxyfluoride powder represented by YOF is preferably from 1 to 20 μm, more preferably from 2 to 10 μm. Further, from the viewpoint of achieving the effects of the invention more reliably and ensuring mixture uniformity, the average particle size $D_{50}$ of the calcium fluoride powder represented by $CaF_2$ is preferably from 10 to 100 μm, more preferably from 20 to 50 μm. The average particle size $D_{50}$ is measured after performing an ultrasonic pretreatment. The measurement can be performed according to the laser diffraction/scattering particle size distribution measurement method, and can be performed according to the method described in detail further below.

The second powder material is made of a powder mixture including a calcium fluoride powder represented by $CaF_2$, an yttrium fluoride powder represented by $YF_3$, and an yttrium oxide powder represented by $Y_2O_3$. From the viewpoint of efficiently producing a powder represented by YOF through the reaction of $YF_3$ and $Y_2O_3$, it is preferable that the content of the yttrium oxide powder represented by $Y_2O_3$ in the second powder material is such that the number of moles of $Y_2O_3$ in the powder with respect to 100 mol of $YF_3$ in the yttrium fluoride powder is preferably from 95 to 105 mol, more preferably from 99 to 101 mol, and even more preferably from 99.9 to 100.1 mol. Further, from the viewpoint of producing a stabilized yttrium oxyfluoride having the excellent effects of the present invention, the amount of the calcium fluoride powder in the second powder material is such that the number of moles of $CaF_2$ in the powder with respect to 100 mol of the total number of moles of yttrium atoms included in the yttrium fluoride powder represented by $YF_3$ and the yttrium oxide powder represented by $Y_2O_3$ is preferably from 8 to 40 mol, more preferably from 10 to 35 mol, even more preferably from 15 to 30 mol, and further more preferably from 15 to 25 mol.

The second powder material may include components other than the calcium fluoride powder represented by $CaF_2$, the yttrium fluoride powder represented by $YF_3$, and the yttrium oxide powder represented by $Y_2O_3$. However, from the viewpoint of improving the durability and plasma resistance of the stabilized yttrium oxyfluoride produced by using the powder material, it is preferable that the total content of the fluoride powder, the yttrium fluoride powder, and the yttrium oxide powder in the second powder material is preferably 50 mass % or greater, more preferably 80 mass % or greater, and even more preferably 90 mass % or greater. The higher the percentage of the total content of the aforementioned powders in the second powder material, the more preferable.

From the viewpoint of achieving the effects of the invention more reliably and ensuring mixture uniformity, the average particle size $D_{50}$ of the yttrium fluoride powder is preferably from 1 to 20 µm, more preferably from 3 to 10 µm. The $D_{50}$ of the yttrium oxide powder is preferably from 1 to 20 µm, more preferably from 3 to 10 µm. Preferred ranges of the average particle size $D_{50}$ of the calcium fluoride powder are the same as the preferred ranges of the average particle size $D_{50}$ of the calcium fluoride powder in the first powder material. The measurement can be performed according to the laser diffraction/scattering particle size distribution measurement method, and can be performed according to the method described in detail further below.

In the present invention, by subjecting the present powder material for producing a stabilized yttrium oxyfluoride of the invention to the later-described firing step, it is possible to suitably obtain an yttrium oxyfluoride represented by YOF that has been stabilized by a calcium fluoride represented by $CaF_2$.

Next, suitable methods for producing a stabilized yttrium oxyfluoride according to the invention are described below. For the method for producing a stabilized yttrium oxyfluoride of the invention, it is possible to use either one of the first method or the second method described below.

The first method involves a step of firing, in an inert atmosphere or in a vacuum, a molded product of a powder mixture including a calcium fluoride powder represented by $CaF_2$ and an yttrium oxyfluoride powder represented by YOF.

For the powder mixture, it is possible to suitably use the aforementioned first powder material. The features described above in relation to the first powder material all apply to the powder mixture.

Examples of usable methods for obtaining a molded product of the powder mixture include mold pressing, rubber pressing (isostatic pressing), sheet forming, extrusion molding, and casting.

The obtained molded product is fired in an inert atmosphere or in a vacuum. Nitrogen or argon can be used for the inert atmosphere.

The firing temperature is from 800° C. to 1700° C. Setting the firing temperature to 800° C. or higher allows the fluoride to solid-solute reliably into the yttrium oxyfluoride. Setting the firing temperature to 1700° C. or lower can suppress the decomposition or denaturation of the oxyfluoride and can suppress cracking in the sintered compact. From this viewpoint, the firing temperature is preferably from 800° C. to 1700° C., more preferably from 1000° C. to 1600° C. The firing time is preferably from 2 to 24 hours, more preferably from 4 to 12 hours.

Firing may be performed under pressure, or may be performed without applying pressure. In cases of pressurizing, concrete examples of pressurization methods during firing include hot pressing, pulse current pressurization (SPS), hot isostatic pressing (HIP), and the like. Setting the pressurization force within a range from 10 to 40 MPa when firing under pressure is preferable, because a dense sintered compact having excellent plasma resistance is easy to obtain while suppressing damage to the pressing mold.

The second method involves a step of firing a molded product of a powder mixture including a calcium fluoride powder represented by $CaF_2$, an yttrium fluoride powder represented by $YF_3$, and an yttrium oxide powder represented by $Y_2O_3$ to thus produce an yttrium oxyfluoride represented by YOF from $YF_3$ and $Y_2O_3$, and then firing the fired molded product in an inert atmosphere or in a vacuum.

For the powder mixture, it is possible to suitably use the aforementioned second powder material. The features described above in relation to the second powder material all apply to the powder mixture.

Examples of methods for obtaining a molded product of the powder mixture include the same methods as those for the first production method.

In the second method, the obtained molded product is fired to produce an yttrium oxyfluoride represented by YOF from $YF_3$ and $Y_2O_3$. The firing atmosphere employed at this time may be an oxygen-containing atmosphere such as atmospheric air, a vacuum, or an inert atmosphere. For the inert atmosphere, the examples of inert atmospheres described in the first method can similarly be used. A vacuum and inert atmosphere is particularly preferable from the viewpoint of enabling continuous implementation with the high-temperature firing in the subsequent stage.

Setting the firing temperature to 800° C. or higher is preferable from the viewpoint of efficiently producing an yttrium oxyfluoride. Setting the firing temperature to 1000° C. or lower is preferable from the viewpoint of preventing the produced YOF from getting oxidized in an oxygen-existing atmosphere. From these viewpoints, the firing temperature is more preferably from 820° C. to 980° C., even more preferably from 850° C. to 950° C. The firing time is preferably from 0.5 to 4 hours, more preferably from 1 to 2 hours.

Firing may be performed under pressure, or may be performed without applying pressure.

Next, the fired product obtained by the aforementioned firing is fired in an inert atmosphere or in a vacuum. Examples of inert gases usable to establish an inert atmosphere include the same gases as described in the first method.

The firing temperature is preferably from 800° C. to 1700° C. Setting the firing temperature to 800° C. or higher allows the fluoride to solid-solute reliably into the yttrium oxyfluoride. Setting the firing temperature to 1700° C. or lower can suppress the decomposition or denaturation of the oxyfluoride and can suppress the occurrence of cracking. From this viewpoint, the firing temperature is preferably from 800° C. to 1700° C., more preferably from 1000° C. to 1600° C. The firing time is preferably from 2 to 24 hours, more preferably from 4 to 12 hours.

Firing may be performed under pressure, or may be performed without applying pressure. In cases of pressurizing, concrete examples of pressurization methods during firing include the same pressurization methods described in the first method. Setting the pressurization force within a range from 10 to 40 MPa when firing under pressure is preferable, because a dense sintered compact having excellent plasma resistance is easy to obtain while suppressing damage to the pressing mold.

The stabilized yttrium oxyfluoride of the invention in a sintered-compact form can be obtained suitably by either one of the first or second method. The bulk-form stabilized yttrium oxyfluoride obtained as above can be suitably used for constituent members of semiconductor manufacturing devices, such as vacuum chambers of etching devices, sample stages and chucks inside the chamber, focus rings, and inner wall materials for etching gas supply ports. Other than for constituent members of semiconductor manufacturing devices, the stabilized yttrium oxyfluoride can be used for constituent members of various plasma treatment devices and chemical plants. Further, a powder obtained by pulverizing the bulk-form stabilized yttrium oxyfluoride as described above can be suitably used as a raw material for a film-form stabilized yttrium oxyfluoride. The obtained film-form stabilized yttrium oxyfluoride can be suitably used for coating purposes in semiconductor manufacturing devices, particularly for coating inner walls of chambers in semiconductor manufacturing devices such as etching devices.

EXAMPLES

The present invention is described in further detail below according to Examples. The scope of the invention, however, is not limited to the following Examples. Unless specifically stated otherwise, "%" refers to "mass %".

Example 1

A powder mixture was obtained by mixing a YOF powder (rhombohedral crystal; average particle size $D_{50}$: 2.8 μm) and 10 mol of a $CaF_2$ powder (average particle size $D_{50}$: 33.5 μm) with respect to 100 mol of the YOF powder. The powder mixture was placed in a mold. The mold was circular in a planar view and 25 mm in diameter. An oil-hydraulic press was used for molding, and a molded product was obtained by uniaxially pressurizing at a pressure of 65 MPa for 0.5 minutes. The obtained molded product was fired in an Ar atmosphere at 1400° C. for 4 hours. In this way, a sintered compact of a stabilized yttrium oxyfluoride was obtained.

The average particle size was measured according to the following method (same applies to the Examples below).
Method for Measuring Average Particle Size $D_{50}$ Measurement was performed using a Microtrac HRA from Nikkiso Co., Ltd. In the measurement, a 2% sodium hexametaphosphate aqueous solution was used as a dispersion medium, and a slurry-state sample was added to a sample circulator chamber of the Microtrac HRA until the device determined that the sample reached an appropriate concentration. The slurry-state sample was prepared by adding 1 g of the powder to 100 ml of a 0.2% sodium hexametaphosphate aqueous solution in a beaker, and then setting the same in an ultrasonic homogenizer (output: 25 W) from Nikkiso Co., Ltd. and subjecting the mixture to an ultrasonic dispersion treatment for 2 minutes.

In order to verify phase transition, the obtained sintered compact was subjected to the following DTA measurement and TMA measurement. The DTA measurement was performed by raising the temperature from 25° C. to 1000° C. The obtained DTA chart was checked to see whether or not an endothermic peak was observed within the range from 550 to 600° C. The results are shown in Table 1.

The TMA measurement was performed by a round-trip measurement wherein the temperature was raised from 25° C. to 1000° C. and then lowered from 1000° C. to 25° C. If a point of discontinuity in dimensional change was observed in the TMA chart obtained by the TMA measurement, the example was found as having phase transition (phase transition: yes); if no point of discontinuity was observed, the example was found as having no phase transition (phase transition: no). The results are shown in Table 1.

Further, the obtained sintered compact was subjected to powder XRD measurement at 25° C. according to the following method. From the obtained XRD chart, the presence/absence of a peak ascribable to rhombohedral YOF near 2θ=14° was verified, and according to this verification, the YOF crystal was identified as a cubic crystal or a rhombohedral crystal. Further, the obtained XRD chart was checked to see whether a peak ascribable to $CaF_2$ was observed. The results are shown in Table 1. According to the XRD chart of the sintered compact obtained in Example 1, no peak ascribable to rhombohedral YOF near 2θ=14° was observed.
DTA Measurement Conditions Measurement was performed by using DTG-60H (manufacturer: Shimadzu Corporation) as the measurement device in air atmosphere according to a temperature program wherein the measurement range was from 25° C. to 1000° C. and the temperature rise rate was 5° C./min, and alumina was used as the reference component. The sample amount was 60 mg.
TMA Measurement Method A test piece (length: 20 mm; width: 5 mm; thickness: 5 mm), which was a sintered compact, was set to TMA8310 (manufacturer: Rigaku Co., Ltd.) as the measurement device. In air atmosphere, the temperature was raised and lowered between 25° C. and 1000° C. at a temperature rise/drop rate of 5° C./minute, and the dimension in the length direction of the test piece during this period was measured, to find the dimensional difference (μm) from the dimension before the test. The load was 5.0 mN.
XRD Measurement Method A portion of the sintered compact was pulverized with a mortar and pestle to obtain a powder, and the powder was subjected to XRD measurement. The measurement instrument used was MiniFlex 600 (manufacturer: Rigaku Co., Ltd.). The measurement conditions were as follows: target: Cu; radiation source: CuKα1 line; tube voltage: 40 kV; tube current: 15 mA; scan rate: 20°/min; scan range: 2θ=3° to 90°.

Examples 2 to 7 and Comparative Example 4

Figure 2:
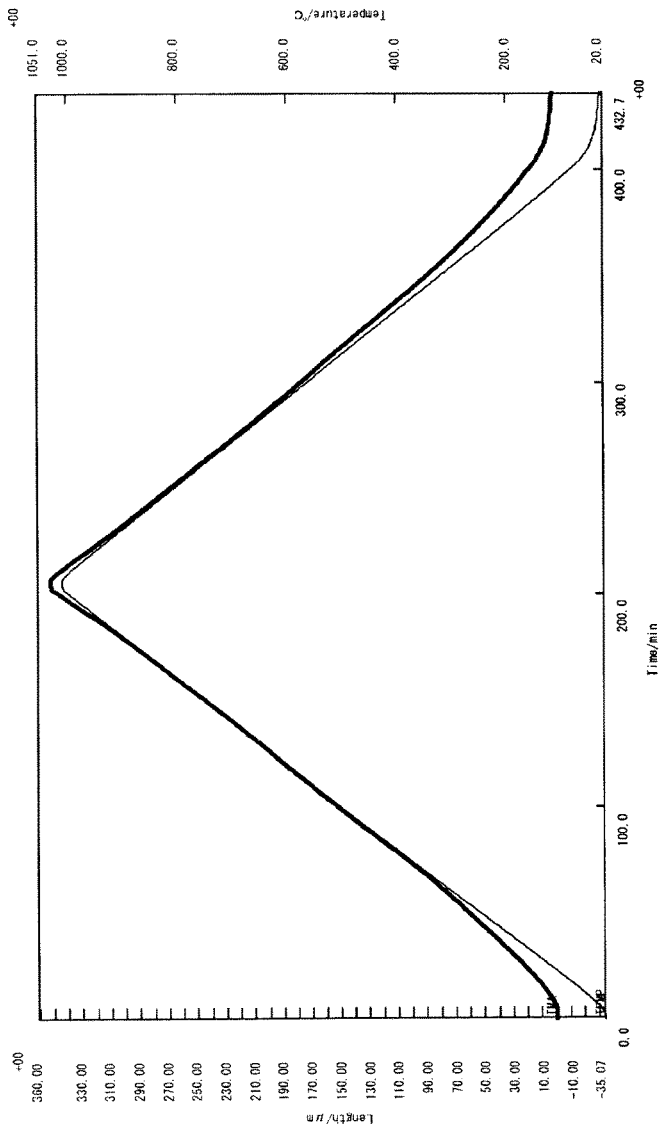
FIG. 2 is a chart of thermomechanical analysis (referred to hereinafter as TMA) for when the temperature of the stabilized yttrium oxyfluoride obtained according to Example 3 is raised from room temperature to 1000° C. and then cooled from 1000° C. to room temperature.
Figure 3:
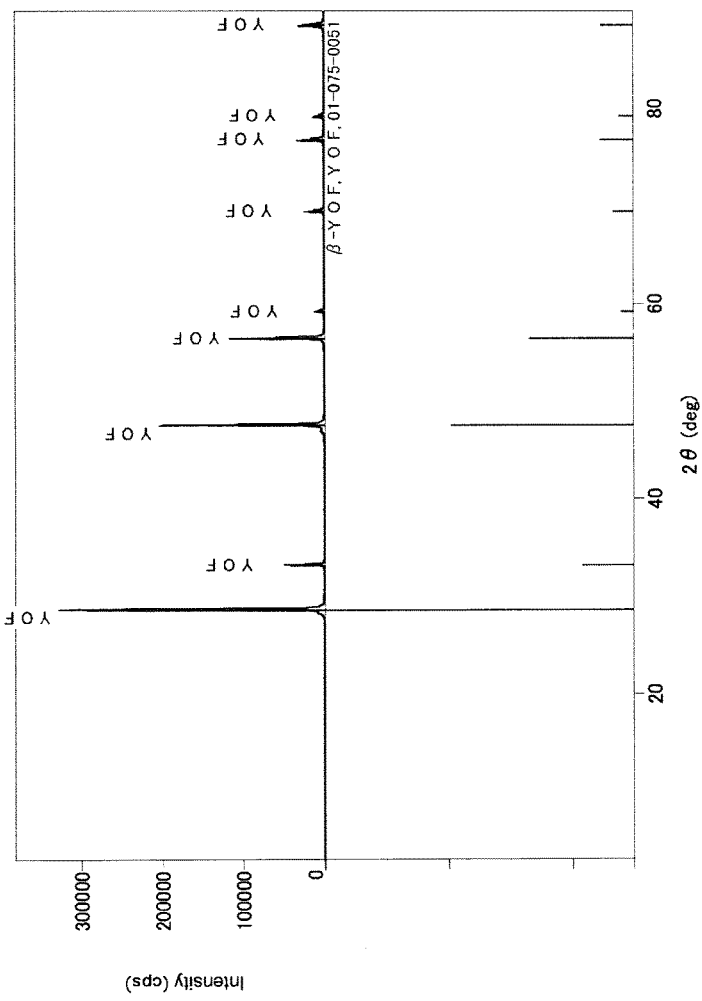
FIG. 3 is a chart illustrating the result of powder X-ray diffraction measurement of the stabilized yttrium oxyfluoride obtained according to Example 3.

Sintered compacts were produced as in Example 1 except that the amount of the $CaF_2$ powder with respect to 100 mol of the YOF powder was changed to the respective amounts shown in Table 1 below, and the respective sintered compacts were evaluated. The results are shown in Table 1. For the sintered compact of Example 3, the DTA chart obtained by the DTA measurement is shown in FIG. 1, the TMA chart obtained by the TMA measurement is shown as the bold line in FIG. 2, and the XRD chart obtained by the XRD measurement is shown in FIG. 3. According to the respective XRD charts of the sintered compacts obtained in Examples 2 to 7, no peak ascribable to a rhombohedral YOF near 2θ=14° was observed. The TEMP curve shown as the thin solid line in FIG. 2 indicates the sample temperature at the respective times during the TMA measurement according to the scale on the right-hand side.

Comparative Examples 1 and 2

Figure 4:
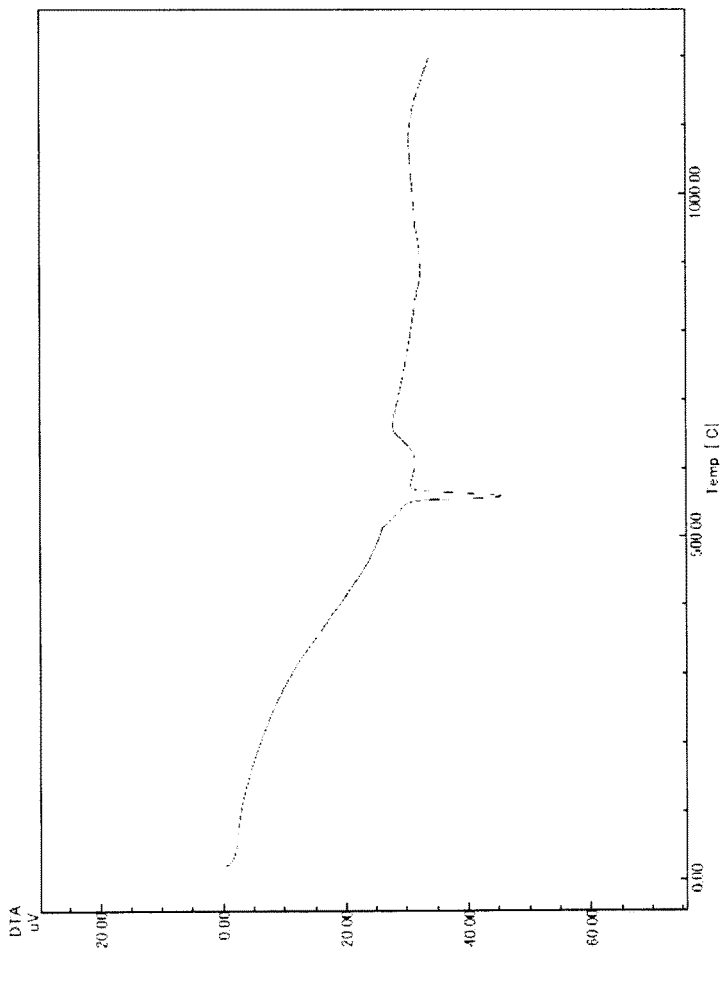
FIG. 4 is a DTA chart for when the temperature of an yttrium oxyfluoride obtained according to Comparative Example 1 is raised from room temperature to 1000° C.
Figure 5:
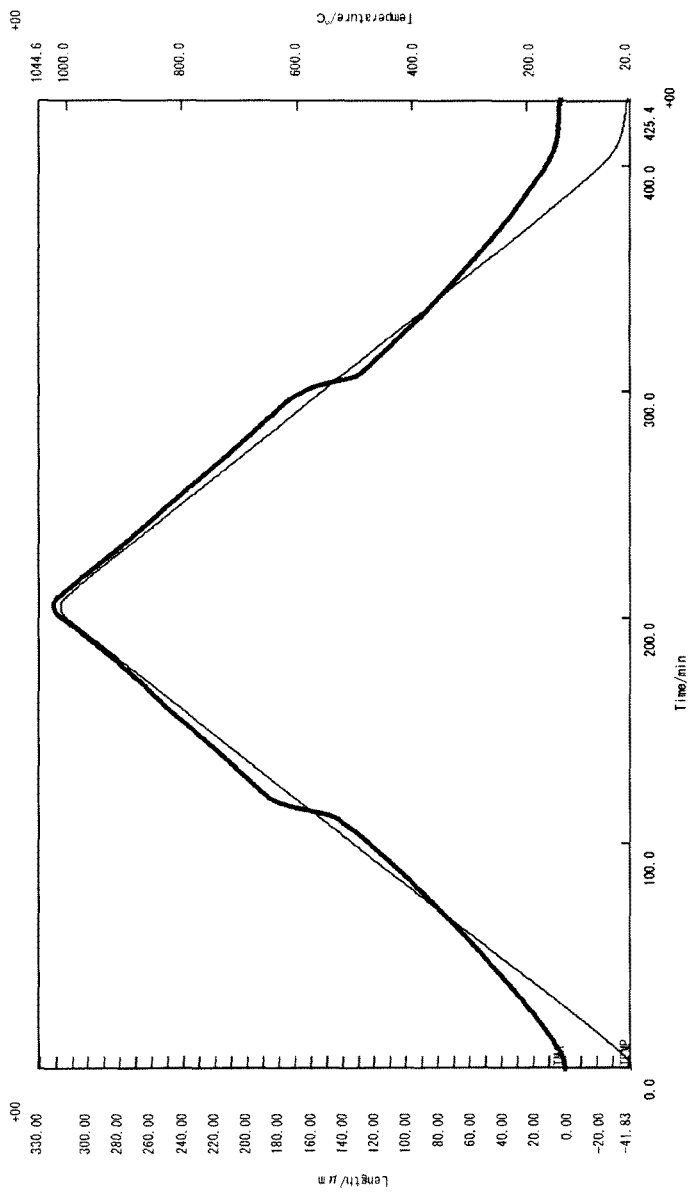
FIG. 5 is a TMA chart for when the temperature of the yttrium oxyfluoride obtained according to Comparative Example 1 is raised from room temperature to 1000° C. and then cooled from 1000° C. to room temperature.
Figure 6:
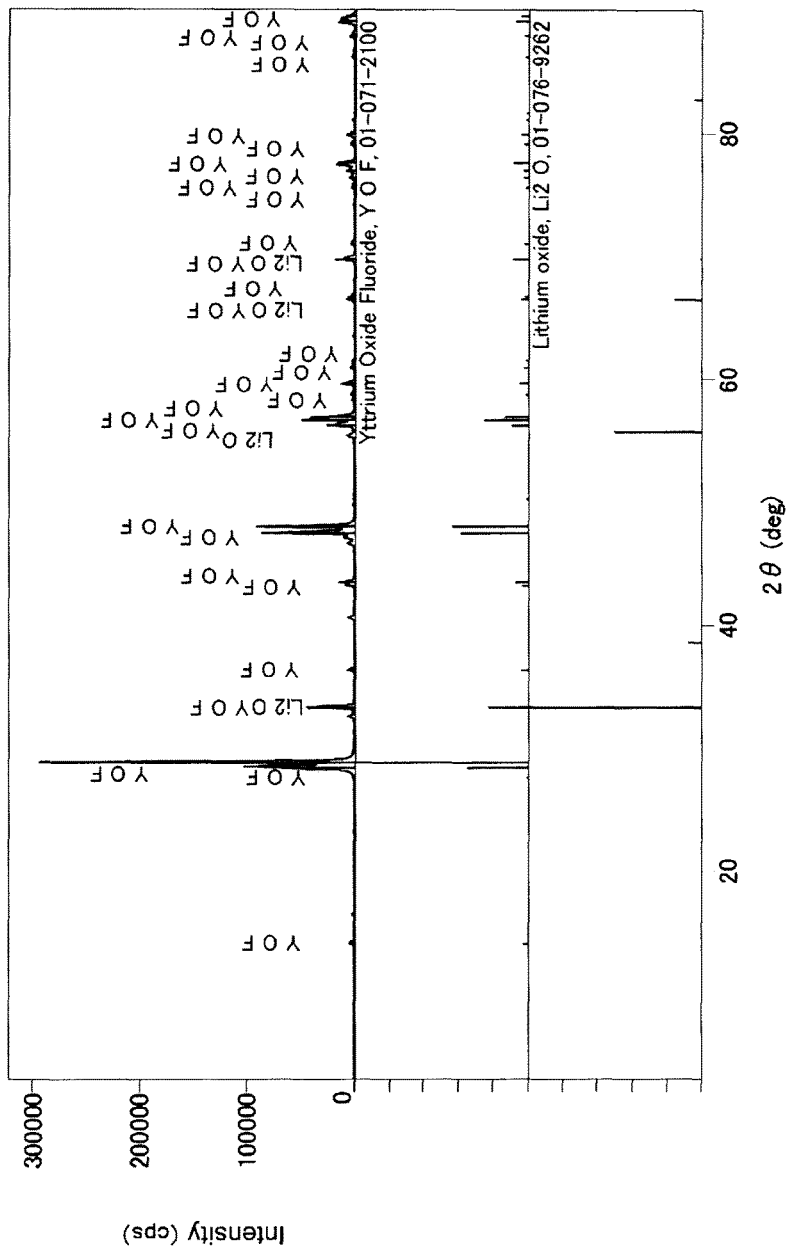
FIG. 6 is a chart illustrating the result of powder X-ray diffraction measurement of the yttrium oxyfluoride obtained according to Comparative Example 1.

Sintered compacts were produced as in Example 1 except that, instead of a $CaF_2$ powder, a LiF powder was used in respective amounts shown in Table 1 below with respect to 100 mol of the YOF powder, and the respective sintered compacts were evaluated. The results are shown in Table 1. The sintered compact obtained in Comparative Example 1 was subjected to DTA measurement, TMA measurement, and XRD measurement as in Example 1, and the obtained charts are shown in FIGS. 4 to 6, respectively. As in FIG. 2, the bold line in FIG. 5 is the TMA chart obtained by the TMA measurement, and the TEMP curve shown as the thin solid line indicates the sample temperature at the respective times during the TMA measurement according to the scale on the right-hand side.

Comparative Example 3

A sintered compact was produced as in Example 1 except that, instead of a $CaF_2$ powder, a $YF_3$ powder was used in an amount shown in Table 1 below with respect to 100 mol of the YOF powder, and the sintered compact was evaluated. The results are shown in Table 1. In Table 1 below, "—" indicates that measurement was not performed.

using a fluoride of calcium, cubic to rhombohedral phase transition is suppressed effectively when cooled from a high temperature to atmospheric temperature. A sintered compact of this yttrium oxyfluoride is effectively prevented from fracture/cracking caused by this phase transition.

In contrast, in the yttrium oxyfluoride of Comparative Example 1 obtained by using a fluoride of lithium, which is a monovalent element, instead of $CaF_2$, phase transition was verified by DTA measurement, TMA measurement, and XRD measurement. Also in the yttrium oxyfluoride of Comparative Example 2, phase transition was verified by TMA measurement and XRD measurement. In Comparative Example 3 which was obtained by using a fluoride of yttrium, which is a trivalent element, instead of $CaF_2$, an yttrium oxyfluoride having a composition different from YOF was produced, and thus stabilization of YOF was not possible.

Examples 8 to 10

A powder mixture was obtained by mixing: a $YF_3$ powder (average particle size $D_{50}$: 5.7 μm); a $Y_2O_3$ powder (average particle size $D_{50}$: 3.1 μm), the number of moles of which with respect to 100 mol of the $YF_3$ powder is shown in Table

TABLE 1

|  | Additive | Amount added (To number of moles of YOF) | Firing temperature (° C.) | XRD | DTA (Phase transition peak) | TMA (Phase transition) |
|---|---|---|---|---|---|---|
| Example 1 | $CaF_2$ | 10 | 1400 | YOF(c) | No | No |
| Example 2 |  | 15 | 1400 | YOF(c) | No | No |
| Example 3 |  | 20 | 1400 | YOF(c) | No | No |
| Example 4 |  | 25 | 1400 | YOF(c) | No | No |
| Example 5 |  | 30 | 1400 | YOF(c) | No | No |
| Example 6 |  | 35 | 1400 | YOF(c) + $CaF_2$ | No | No |
| Example 7 |  | 40 | 1400 | YOF(c) + $CaF_2$ | No | No |
| Comparative Example 4 | $CaF_2$ | 5 | 1400 | YOF(r) | Yes | Yes |
| Comparative Example 1 | LiF | 10 | 1400 | YOF(r) + $Li_2O$ | Yes | Yes |
| Comparative Example 2 |  | 15 | 1400 | YOF(r) + $Li_2O$ | — | Yes |
| Comparative Example 3 | $YF_3$ | 25.36 | 1400 | $Y_5O_4F_7$ | No | No |

(In Table 1, YOF(c) refers to cubic YOF, and YOF(r) refers to rhombohedral YOF.)

Table 1 clearly shows that, as for the sintered compacts of the yttrium oxyfluoride obtained in the respective Examples, no endothermic peak, which would otherwise be observed if a rhombohedral to cubic phase transition occurred during temperature rise, was observed in the DTA measurement. Further, in the TMA measurement, no point of discontinuity in dimensional change, which would otherwise be observed if a cubic to rhombohedral phase transition occurred during temperature drop, was observed. Further, Table 1 clearly shows that the sintered compacts of the yttrium oxyfluoride obtained in the respective Examples are cubic crystals at 25° C., and no X-ray diffraction peak ascribable to a rhombohedral yttrium oxyfluoride, nor X-ray diffraction peak ascribable to $CaF_2$, was observed.

The aforementioned results clearly indicate that, in the yttrium oxyfluoride of the respective Examples stabilized by 2; and a $CaF_2$ powder (average particle size $D_{50}$: 33.5 μm), the number of moles of which with respect to 100 mol of the total number of moles of the $YF_3$ powder and the $Y_2O_3$ powder (the total number of moles of yttrium atoms included in the yttrium fluoride powder represented by $YF_3$ and the yttrium oxide powder represented by $Y_2O_3$) is shown in Table 2. From the powder mixture, a molded product was obtained as in Example 1. The obtained molded product was fired in an Ar atmosphere at 900° C. for 2 hours. Then, the fired product was fired in an Ar atmosphere at 1400° C. for 4 hours. This two-stage firing was performed continuously in a single firing batch. A sintered compact was obtained as described above. The obtained sintered compact was evaluated as in Example 1. The results are shown in Table 2.

TABLE 2

|  | Amount of Y$_2$O$_3$ added (To number of moles of YF$_3$) | Amount of CaF$_2$ added (To number of moles of YF$_3$ + Y$_2$O$_3$) | First stage firing temperature (° C.) | Second stage firing temperature (° C.) | XRD | DTA (Phase transition peak) | TMA (Phase transition) |
|---|---|---|---|---|---|---|---|
| Example 8 | 100 | 15 | 900 | 1400 | YOF(c) | No | No |
| Example 9 | 100 | 20 | 900 | 1400 | YOF(c) | No | No |
| Example 10 | 100 | 25 | 900 | 1400 | YOF(c) | No | No |

(In Table 2, YOF(c) refers to cubic YOF.)

Table 2 clearly shows that, even when a powder mixture including a CaF$_2$ powder, an yttrium fluoride powder represented by YF$_3$, and an yttrium oxide powder represented by Y$_2$O$_3$ was used as a raw material, it was possible to obtain an yttrium oxyfluoride in which cubic to rhombohedral phase transition was effectively suppressed by CaF$_2$, as in the case where a powder mixture including a CaF$_2$ powder and an yttrium oxyfluoride powder represented by YOF was used as a raw material. A sintered compact of this yttrium oxyfluoride is effectively prevented from fracture/cracking caused by this phase transition.

The invention claimed is:

1. An yttrium oxyfluoride represented by YOF, the yttrium oxyfluoride being stabilized by a calcium fluoride represented by CaF$_2$, wherein, when the yttrium oxyfluoride is subjected to powder X-ray diffraction measurement at 25° C. within a range 2θ=10° to 90° by employing a CuKα1 line as a radiation source, the yttrium oxyfluoride satisfies one of (A) or (B) below:
    (A) when no XRD peak caused by YOF other than cubic and rhombohedral crystals is observed, no reflection peak from a (003) plane of a rhombohedral YOF is observed at around 2θ=14°; and
    (B) a main peak of a cubic YOF is observed at 2θ=28.81°, and the height of a reflection peak from a (003) plane of a rhombohedral YOF observed at around 2θ=14° is less than 1/100 of the peak height of the main peak of the cubic YOF.

2. The yttrium oxyfluoride according to claim 1, wherein, when the yttrium oxyfluoride is subjected to DTA measurement wherein the temperature is raised from 25° C. to 1000° C. at a temperature rise rate of 5° C./min, no endothermic peak caused by phase transition from a cubic or tetragonal crystal to a rhombohedral crystal is observed in a range from 550 to 600° C.

3. The yttrium oxyfluoride according to claim 1, wherein, when the yttrium oxyfluoride is subjected to TMA measurement wherein the temperature is raised/lowered between 25° C. and 1000° C. at a temperature rise/drop rate of 5° C./min, no point of discontinuity in dimensional change caused by phase transition is observed within the measurement range,
    wherein having a point of discontinuity in dimensional change corresponds to a case in which two inflection points are observed during temperature rise or temperature drop, and
    when a low-temperature-side point of the two inflection points is defined as T1 and a high-temperature-side point is defined as T2, a tangent line of the TMA curve at a point that is 10° C. toward the low-temperature side than T1 and a tangent line of the TMA curve located at the center between T1 and T2 intersect only at one intersection point and do not have the same inclination.

4. The yttrium oxyfluoride according to claim 1, wherein the number of moles of Ca with respect to 100 mol of yttrium is from 8 to 40 mol.

5. A powder material for producing a stabilized yttrium oxyfluoride, the powder material comprising a powder mixture including a calcium fluoride powder represented by CaF$_2$ and an yttrium oxyfluoride powder represented by YOF, the powder material being used to produce the yttrium oxyfluoride according to claim 1 by being fired in an inert atmosphere or in a vacuum at a temperature from 1000° C. to 1700° C.

6. The powder material for producing a stabilized yttrium oxyfluoride according to claim 5, wherein an average particle size D$_{50}$ of the calcium fluoride powder is from 10 to 100 μm, and an average particle size D$_{50}$ of the yttrium oxyfluoride powder is from 1 to 20 μm.

7. A powder material for producing a stabilized yttrium oxyfluoride, the powder material comprising a powder mixture including a calcium fluoride powder represented by CaF$_2$, an yttrium fluoride powder represented by YF$_3$, and an yttrium oxide powder represented by Y$_2$O$_3$, the powder material being used to produce the yttrium oxyfluoride according to claim 1 by being fired to produce an yttrium oxyfluoride represented by YOF from YF$_3$ and Y$_2$O$_3$, and then fired in an inert atmosphere or in a vacuum at a temperature from 1000° C. to 1700° C.

8. The powder material for producing a stabilized yttrium oxyfluoride according to claim 7, wherein an average particle size D$_{50}$ of the calcium fluoride powder is from 10 to 100 μm, an average particle size D$_{50}$ of the yttrium fluoride powder is from 1 to 20 μm, and D$_{50}$ of the yttrium oxide powder is from 1 to 20 μm.

9. A method for producing a stabilized yttrium oxyfluoride, the method comprising a step of firing, in an inert atmosphere or in a vacuum at a temperature from 1000° C. to 1700° C., a molded product of a powder mixture including a calcium fluoride powder represented by CaF$_2$ and an yttrium oxyfluoride powder represented by YOF.

10. A method for producing a stabilized yttrium oxyfluoride, the method comprising steps of
    firing a molded product of a powder mixture including a calcium fluoride powder represented by CaF$_2$, an yttrium fluoride powder represented by YF$_3$, and an yttrium oxide powder represented by Y$_2$O$_3$ to thus produce an yttrium oxyfluoride represented by YOF from YF$_3$ and Y$_2$O$_3$, and
    then firing the fired molded product in an inert atmosphere or in a vacuum at a temperature from 1000° C. to 1700° C.

* * * * *